Figure 1:
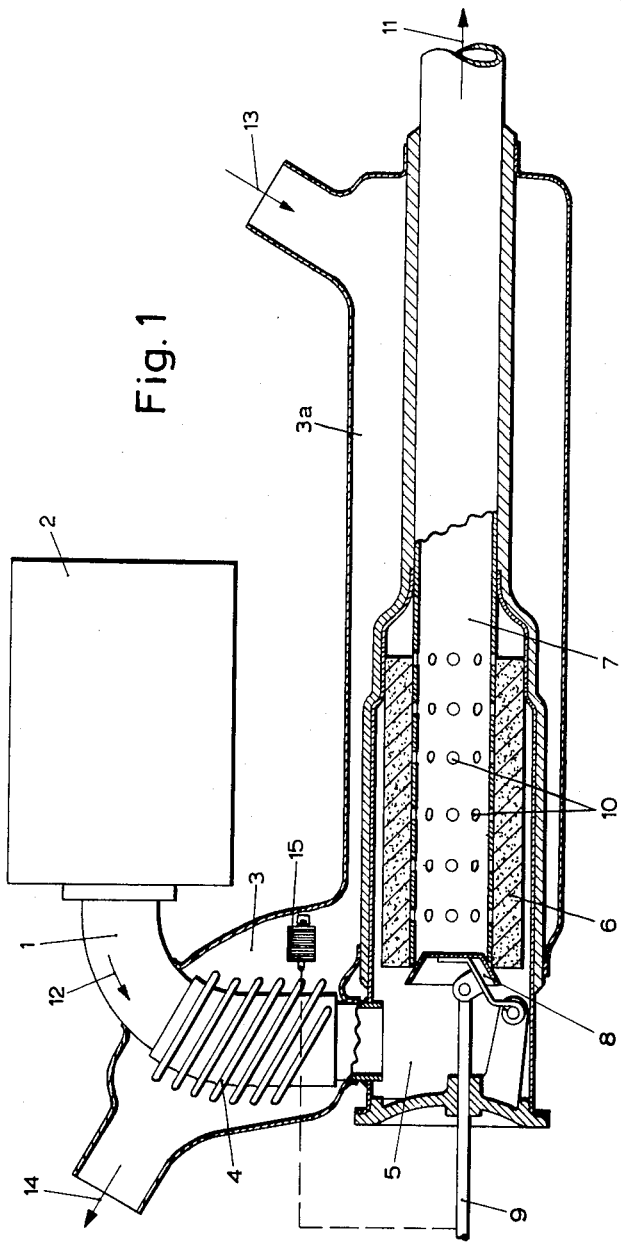

INVENTOR.
Willi Ruge
BY
Watson, Cole, Grindle & Watson
Attys.

United States Patent Office 3,236,044
Patented Feb. 22, 1966

3,236,044
HEATING SYSTEM FOR MOTOR VEHICLES
Willi Ruge, Birkenweg 11, Wolfsburg,
Hannover, Germany
Filed Dec. 20, 1963, Ser. No. 332,109
Claims priority, application Germany, Dec. 21, 1962,
V 23,451; Sept. 20, 1963, V 24,606
5 Claims. (Cl. 60—30)

The invention relates to a heating system for motor vehicles with internal combustion engines, in which the heating air flowing into the interior of the vehicle is heated by parts of the engine conducting off the exhaust gases, the exhaust gases being subjected to additional heating by afterburning with the aid of a catalyst arranged in the exhaust pipeline.

A heating system of this kind is known in which the catalyst is surrounded by a jacket arrangement through which the heating air flows, the exhaust gases being catalytically afterburnt beyond the silencer before passing out into the atmosphere.

In the known heating system, the exhaust gases are afterburnt continuously, so that the catalyst is always in use. However, in the case of modern fuels with high lead content, the life of the catalysts is considerably reduced thereby as a result of premature saturation.

Furthermore, an exhaust gas detoxicating arrangement for motor vehicles is known in which an additional conduit is provided for bypassing the catalyst. This conduit is normally closed by a bypass flap and, in the event of too high temperature in the catalyst, is opened by a thermoswitch arranged therein.

The invention makes use of this arrangement in the heating system mentioned at the outset, with the result that the objections due to premature saturation of the catalyst are avoided.

Therefore, according to the invention at least one additional closable conduit, known per se, is provided for the exhaust gases which conduit bypasses the catalyst and is closed at low heating temperatures. With such an arrangement it is also possible to achieve that only the incomplete combustion occurring when the engine is under light load is utilized for increasing the heating by aftercombustion.

The catalyst may be constructed as a cylindrical cartridge with an annular cross-section, in which case the bypass conduit extends through the catalyst in longitudinal direction. Apertures may be provided in the bypass conduit in the region of the catalyst for allowing the exhaust gases to pass out therethrough. The bypass conduit is preferably closable by means of a throttle flap, the adjustment of which can be connected with the adjusting device for controlling the heating in such a way that, when the heating is shut-off, the bypass conduit is freed for the passage of the exhaust gases. The throttle flap can also be operated by means of a thermostat arranged in the heating air conduit so that when the temperature in the heating air conduit is sufficiently high, the bypass conduit is opened. The actual exhaust gas conduit in which the catalyst is situated can be additionally closed by means of another throttle flap, so that, when the bypass conduit is open the catalyst does not come into contact with the exhaust gases at all.

In many cases it is advantageous for the exhaust gases also to give up heat to the fresh air brushing the exhaust pipe when the catalyst is switched off. The heat radiating surface should then be as large as possible.

This problem is solved according to a further development of the invention by employing a perforated pipe which is surrounded by the catalyst mass and closed at the end, and located in the interior of an exhaust gas conduit serving as hot air exchanger, the catalyst mass being arranged at a distance from the inner wall of the exhaust gas conduit so that an external annular passage is formed, the exhaust gases being conducted either through the perforated pipe and the catalyst mass or outside the catalyst mass through the external annular passage. When the heating is shut-off the inner perforated pipe is closed so that the exhaust gases merely flow through the outer exhaust gas conduit serving as heat exchanger without passing through the catalyst mass. They thereby give up their heat to the walls of this conduit so that an exchange of heat takes place in known manner between the exhaust gases and the circulating fresh air. With the object of supplementing the heating, the inlet to the outer annular passage is closed preferably by means of a rotary slide valve and the inlet to the perforated pipe opened, so that the exhaust gases flow along the interior of this pipe, whence they enter the catalyst mass, are subjected to aftercombustion and heated up, whereby they give up their heat to the outer exhaust gas passage.

Possibilities of regulating the heating air are provided in this arrangement according to the invention by a rotary slide valve which allows the outer annular passage to be opened or closed and by controlling the quantity of additional air necessary for the catalytic after-combustion. This control may also be effected by regulating the number of revolutions of the blower motor for the additional air.

The invention is hereinafter described with reference to two embodiments illustrated by way of example in the accompanying drawings but is not restricted thereto.

Figure 2:
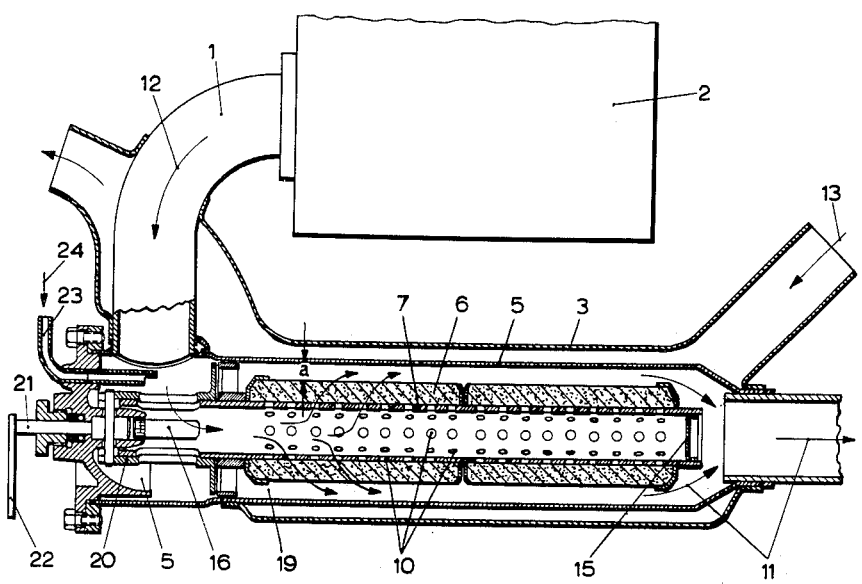
Figures 3, 4:
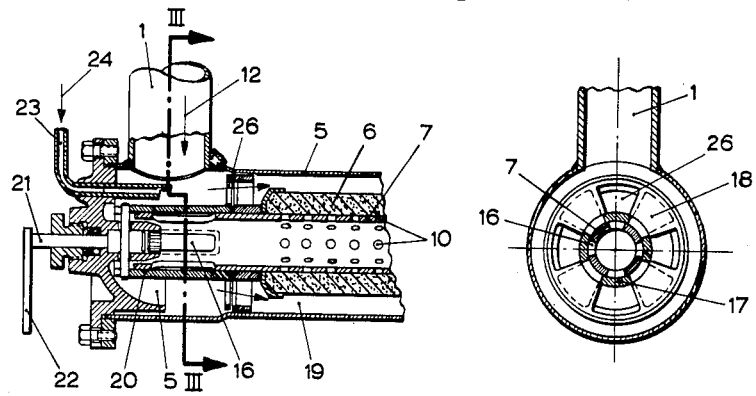

In the drawings equivalent parts are provided with like references,

FIG. 1 being a section of the first form of construction of a heating system according to the invention;

FIG. 2 a section of a second form of construction of a heating system according to the invention;

FIG. 3 a part section showing the flow conditions when the rotary slide valve of the construction according to FIG. 2 is closed, and FIG. 4 a section taken on line III—III of FIG. 3.

In FIG. 1 an exhaust pipe 1 is connected to an internal combustion engine 2. The exhaust pipe 1 passes through a jacket 3 and is provided with ribs 4 along a portion of its length. It leads into an exhaust conduit 5 in which a catalyst 6 is arranged which in the example illustrated is of cylindrical shape and surrounds a second exhaust pipe 7. The inlet to the exhaust pipe 7 can be closed by means of a throttle flap 8 which can be actuated by a rod system 9. The exhaust gas conduit 5 terminates beyond the catalyst 6 and is there connected with the exhaust pipe 7 so that the exhaust gases flowing into the conduit 5 must, when the throttle flap 8 is closed, pass through the catalyst 6 into the pipe 7. For this purpose the pipe 7 is provided in the region of the catalyst 6 with bores 10 for admitting the after-burnt exhaust gases. The exhaust gases then flow in the direction of the arrow 11 into a silencer, not shown in the drawing.

This arrangement operates in the following manner:

The exhaust gases coming from the engine 2 in the direction of the arrow 12 enter the exhaust gas conduit 5 where, when the throttle flap 8 is closed, they pass through the catalyst 6, are there after-burnt and consequently heat the walls of the exhaust gas conduit 5 and pipe 7. As the exhaust gas conduit 5 and pipe 7 are in turn surrounded by a heating air jacket 3a, the heating air flowing in the direction of the arrow 13 will be heated on the outer wall of these pipes. The pipe 7 may be provided with heat exchange ribs at its end nearer the silencer. The heating air can then be further heated on the heat exchange ribs 4 of the actual exhaust pipe 1 before it passes into the interior of the vehicle in the direction of the arrow 14.

When the throttle flap 8 is open and the heating preferably shut-off, the exhaust gases coming from the pipe 1 can flow directly into the pipe 7, without passing through the catalyst 6 which is thus by-passed. The exhaust gases will only pass through the catalyst 6 into the pipe 7 through the bores 10 to an insignificant extent, because they travel along the path of least resistance. The catalyst compartment may, however be closable by another throttle flap or valve which must then be constructed in the form of a ring. Instead of the arrangement illustrated, a conduit may also be provided outside the jacket 3a which can be closed by the throttle flap 8 and leads directly into the pipe 7, so that the catalyst is completly by-passed when the heating is shut-off.

The additional heating of the air effected by the after-burning can be regulated by means of a thermostat 15 arranged in the jacket 3 so that, when the temperature in the jacket 3 is sufficiently high the valve or flap 8 is closed and the exhaust gases do not pass through the catalyst. Such a regulation system also preserves the catalyst.

A modified form of construction according to the invention will now be described with reference to FIGS. 2, 3 and 4 of the drawings, in which the exhaust gases also give up heat to the fresh air flowing around the exhaust pipe when the catalyst is cut-out; the heat radiating surface must then be as large as possible.

FIG. 2 shows an exhaust pipe 1 connected up with the engine 2. This exhaust pipe leads into an exhaust gas conduit 5 in which a pipe 7 provided with bores 10 is arranged which is closed at its outlet end by a cap 15 or the like. The pipe 7 is surrounded by a catalyst mass 6 the outer side of which is at a distance from the inner wall of the exhaust gas conduit 5 so that an outer annular passage 19 is formed. The exhaust pipe and exhaust gas conduit 5 are surounded by a jacket 3 through which fresh air which is to be heated flows in the direction of the arrow 13.

The exhaust gases coming from the engine in the direction of the arrow 12 enter the exhaust gas conduit 5 through apertures 16 at the front end of the pipe 7. These apertures 16 can be closed by sliding plates or sleeve valve 17 (FIG. 4). Corresponding plates 18 connected with the plates 17 enable the outer annular passage 19 in the exhaust gas conduit 5 to be closed. The plates 17 and 18 together with an adjusting device form a rotary slide valve 20. This valve can be operated from outside through the intermediary of a shaft 21 and a handle 22 or the like extending therefrom.

The additional or secondary air is fed through the tube 23 in the direction of the arrow 24 into the outer annular passage 19 and consequently to the catalyst 6.

FIG. 2 shows the rotary slide or sleeve valve 20 in a position in which the outer annular passage 19 is closed. In this position the gases flowing through the pipe 1 in the direction of the arrow 12 enter the pipe 7 through the apertures 16 and thence pass through the bores 10 into the catalyst mass 6 where they are after-burnt and consequently become further heated. The after-burning is assisted by the supplementary air which flows in through the tube 23. The exhaust gases heated up in this manner give up their heat to the wall of the exhaust gas conduit 5 where the heat is again exchanged with the heating air circulating around the exhaust gas conduit 5. The exhaust gases then flow in the direction of the arrow 11 to the silencer of the internal combustion engine.

FIG. 3 shows the rotary slide valve 20 in a position in which the apertures 16 leading into the inner pipe 7 are closed and the outer annular passage 19 is open.

The exhaust gases flowing through the exhaust gas conduit 5 in the direction of the arrow 12 now enter the outer annular passage 19 through the apertures 26 and flow around the catalyst mass 6 without after-burning because they are not forced to enter the catalyst mass. In addition the supplementary air is shut-off. This is preferably effected by electrical means controlling the supplementary air blower. The switch necessary for this purpose is preferably connected with the device for controlling the rotary slide valve.

A portion of the heat normally contained in the exhaust gases is given off in known manner to the outer wall of the exhaust gas conduit 5. By setting the rotary slide valve to intermediate positions it is possible to conduct a greater or lesser quantity of the exhaust gases through the catalyst mass and thereby control the intensity of the heating.

Another means of regulation can be obtained by changing the quantity of additional air supplied. The quantity of this additional air can be controlled by regulating the number of revolutions of the blower feeding the additional air.

The setting of the rotary slide valve 20 as well as the number of revolutions of the blower can be controlled by a thermostat in the heating air current.

What is claimed is:

1. Heating system for motor vehicles comprising an exhaust pipe connected to an internal combustion engine and leading to the atmosphere, a jacket surrounding the greater part of the exhaust pipe to form a passage for air to be heated by the exhaust gases in the exhaust pipe, a pipe with perforations therein arranged in the exhaust pipe and surrounded by a catalyst to provide additional heat when the exhaust gases are by-passed through the catalyst, said catalyst around the second-mentioned pipe forming an outer annular passage for the exhaust gases with the exhaust pipe, and a rotary sleeve valve around the second-mentioned pipe to close off or admit the exhaust gases around the catalyst in the annular passage or through the catalyst through the perforations and then into the annular passage.

2. Heating system according to claim 1, wherein a thermostat regulator is provided for operating the rotary sleeve valve.

3. Heating system according to claim 1, wherein an additional pipe is provided so that air is introduced into the perforated pipe for intensifying the catalytic after-combustion, the quantity of air fed being controlled by changing the number of revolutions of a blower feeding the air.

4. Heating system according to claim 1, wherein an additional pipe is provided so that air is introduced into the perforated pipe for intensifying the catalytic after-combustion, the quantity of air fed being controlled by changing the number of revolutions of a blower feeding the air, and wherein a thermostat is provided to control the adjustment of the rotary sleeve valve and regulate the air blower.

5. Heating system according to claim 1, in which a second valve is connected integral with the sleeve valve to open or close passage of the exhaust gases as to the annular passage so that when the sleeve valve is closed the second valve is open.

References Cited by the Examiner

UNITED STATES PATENTS

| | | |
|---|---|---|
| 1,804,144 | 5/1931 | Bissell. |
| 2,551,823 | 5/1951 | Buttner et al. _____ 237—12.3 |
| 2,991,160 | 7/1961 | Claussen _____ 60—30 X |
| 3,094,394 | 6/1963 | Innes et al. _____ 60—30 X |

SAMUEL LEVINE, *Primary Examiner.*

EDGAR W. GEOGHEGAN, *Examiner.*